(12) United States Patent
Engdahl

(10) Patent No.: US 9,322,500 B2
(45) Date of Patent: Apr. 26, 2016

(54) COMPRESSED AIR COUPLING

(75) Inventor: Björn Engdahl, Stockholm (SE)

(73) Assignee: CEIN AB, Skövde (SE)

( * ) Notice: Subject to any disclaimer, the term of this patent is extended or adjusted under 35 U.S.C. 154(b) by 196 days.

(21) Appl. No.: 14/111,478

(22) PCT Filed: Apr. 13, 2012

(86) PCT No.: PCT/EP2012/056781
§ 371 (c)(1),
(2), (4) Date: Nov. 12, 2013

(87) PCT Pub. No.: WO2012/140199
PCT Pub. Date: Oct. 18, 2012

(65) Prior Publication Data
US 2014/0054481 A1 Feb. 27, 2014

(30) Foreign Application Priority Data
Apr. 14, 2011 (EP) .................................... 11162404

(51) Int. Cl.
*F16L 37/42* (2006.01)
*F16L 37/084* (2006.01)
*F16L 37/138* (2006.01)

(52) U.S. Cl.
CPC ........... *F16L 37/138* (2013.01); *F16L 37/0848* (2013.01); *F16L 37/42* (2013.01)

(58) Field of Classification Search
CPC ... F16L 37/42; F16L 37/0848; F16L 37/0847; F16L 37/096; F16L 37/0987; F16L 37/127; F16L 37/12; F16L 37/38; F16L 37/40; F16L 37/44

USPC ............................................ 251/149.6, 149.9
See application file for complete search history.

(56) References Cited

U.S. PATENT DOCUMENTS

| 2,322,877 | A | * | 6/1943 | Parker | 251/149.6 |
| 2,327,611 | A | * | 8/1943 | Schelwer | 285/316 |
| 2,708,589 | A | * | 5/1955 | Masek | 285/277 |
| 2,777,716 | A | * | 1/1957 | Gray | 285/276 |

(Continued)

FOREIGN PATENT DOCUMENTS

| EP | 0664866 A1 | 8/1995 |
| EP | 0839298 A1 | 5/1998 |
| WO | WO-9747911 A1 | 12/1997 |

OTHER PUBLICATIONS

Fromentel, Henri, "International Search Report," prepared for PCT/EP2012/056781, as mailed Jun. 6, 2012, 4 pages.

*Primary Examiner* — Mary McManmon
*Assistant Examiner* — David Colon Morales
(74) *Attorney, Agent, or Firm* — Winstead PC

(57) ABSTRACT

A female coupling-half has two pawls (7) each with a distal detent (8), to engage the nipple (3) circumferential groove, and a proximal rounded detent (15), which can lodge in either a rest closed position (16) for a closed valve (2) or a valve-open position (17). The inserted nipple (3) moves the valve (2) which brings with it the pawls (7) via central projections (13) thereon and the manual sleeve (10) until the proximal rounded detent (15) lodges in its valve-open position (17). Retraction of the sleeve (10) for release holds the nipple (3) in an intermediate pressure relief position until ejection pressure is no longer exerted on the nipple (3) and the sleeve (10) is allowed to spring out to its fully extended position completely releasing the nipple (3).

6 Claims, 7 Drawing Sheets

(56) References Cited

U.S. PATENT DOCUMENTS

| | | | | |
|---|---|---|---|---|
| 2,919,935 | A * | 1/1960 | Nyberg | 251/149.6 |
| 3,404,705 | A * | 10/1968 | Zopf et al. | 137/625.25 |
| 3,406,942 | A * | 10/1968 | Bocceda | 251/149.4 |
| 4,366,945 | A * | 1/1983 | Blauenstein | 251/149.6 |
| 4,982,761 | A * | 1/1991 | Kreczko et al. | 137/614.03 |
| 5,074,524 | A * | 12/1991 | Wade | 251/149.6 |
| 5,290,009 | A * | 3/1994 | Heilmann | 251/149.6 |
| 5,445,358 | A * | 8/1995 | Anderson | 251/149.6 |
| 5,540,250 | A * | 7/1996 | Mullins | 137/77 |
| 5,547,166 | A * | 8/1996 | Engdahl | 251/149.6 |
| 5,806,832 | A * | 9/1998 | Larbuisson | 251/149.6 |
| 5,984,265 | A * | 11/1999 | Engdahl | 251/148 |
| 6,279,874 | B1 * | 8/2001 | Nyberg | 251/149.6 |
| 6,412,828 | B1 * | 7/2002 | Lacroix et al. | 285/316 |
| 7,497,231 | B2 * | 3/2009 | Sasa | 137/614.06 |
| 2009/0050836 | A1 * | 2/2009 | Chang | 251/353 |
| 2009/0146421 | A1 * | 6/2009 | Engdahl | 285/306 |
| 2009/0166571 | A1 * | 7/2009 | Asai et al. | 251/149.1 |
| 2009/0273183 | A1 * | 11/2009 | Chambaud et al. | 285/313 |

\* cited by examiner ness of the end of the sleeve when the hose is pulled across a floor, for example, or through an environment with obstacles.

COMPRESSED AIR COUPLING

TECHNICAL FIELD

The present invention relates to a female fluid medium coupling-half suited for coupling together with a standard nipple, as recited in the preamble to the accompanying claim 1.

BACKGROUND ART

EP 0839298 B1 (having the same inventor) describes a hose coupling suitable for compressed air lines where the female part comprises a valve which opens upon insertion of the male nipple, a displaceable sleeve to open the locked coupling and locking pawls. This coupling is also provided with separate stop elements engaged during decoupling to hold the nipple in an intermediate air pressure releasing position to prevent the nipple from dangerously flying off due to residual pressure.

EP 0664866 B1 (having the same inventor) discloses a simpler and more effective design of a compressed air safety coupling, which employs pawl elements, each provided with both a proximal and a distal detent, to effect, in conjunction with a specially designed sleeve, both a very effective locking position and an intermediate hold position during residual pressure relief prior to complete release. The particular design described in EP 0664866 B1 demands, unfortunately, certain manual steps in its assembly due to the configuration of the pawl elements, making it difficult or impossible to assemble the female coupler-half using a robot. This coupling is designed for use with European standard nipples [FIG. 3]. The configuration of the pawl elements makes it impossible to use this particular concept described with both nipples of European (longer neck) standard [FIG. 3] and with Asian (short neck) standard [FIG. 2].

Long neck (European) nipples, such as that shown in FIG. 3, can be paired in certain prior art designs with a female coupling-half which is provided with a protective collar completely covering the exposed end of the manually operated sleeve. This collar prevents inadvertent pulling back of the sleeve should the sleeve stick to something or become obstructed when the coupled hose is pulled. Such a collar completely covering the sleeve end has, in the prior art designs, not been possible except with long neck nipples due to the lack of space.

SUMMARY OF THE INVENTION

Fluid medium couplers, such as pneumatic couplers, typically connect a nipple on the tool side with a female half on the supply side, containing a valve, which opens only when a nipple is inserted, and a spring loaded sleeve, which can be retracted to decouple the two parts. It is often desirable, if not required, to consider two safety aspects when developing a coupler of this type:

Firstly, retracting the sleeve to decouple the two parts should not permit the nipple part to fly off, due to residual pressure, and cause personal injury or damage. There should be an intermediate holding stage in which residual pressure is let out before full separation of the two parts is possible.

Secondly, it is desirable to have a protective collar around the end of the sleeve of the female half. This protective collar prevents the sleeve from being accidentally retracted, with decoupling as a result. The protective collar prevents an axial, sleeve retracting, force from being applied to the end of the sleeve when the hose is pulled across a floor, for example, or through an environment with obstacles.

These two desirable features are difficult to achieve with known designs for a nipple with a short distance between the circumferential groove and the abutment face of the nipple, such as is the case in the CEJN 315 Series standard nipple [shown in FIG. 2], or the Nitto Kohki Co. Ltd. Hi-Cupla plug, which will be referred to in the following as the Asian standard compressed air nipple. It has not been possible to achieve these safety features in the short space available according to Asian standard, nor has it been possible to achieve satisfactory strength and wear resistance in this short coupling. The female coupling half should be no longer than existing Asian standard female coupling halves. None of these desirable features is achieved at present in any female coupling-half design applicable to the short neck Asian nipples for compressed air couplings. A female hose coupling-half as described in the preamble to the accompanying claim 1 which has the characterizing features of the accompanying claim 1 achieves both of these advantages in an inventive manner.

BRIEF DESCRIPTION OF THE DRAWINGS

The present invention will be described with reference to a non-limiting example shown in the accompanying drawings, of which.

DETAILED DESCRIPTION

Figure 2:
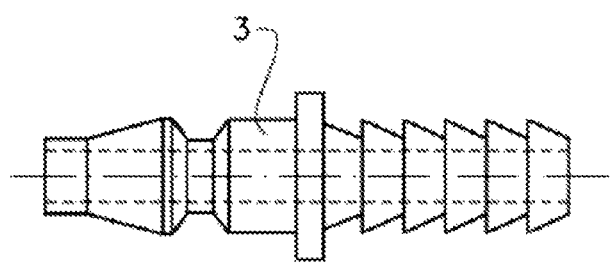
FIG. 2 shows a compressed air nipple of Asian (short neck) standard.
Figure 3:
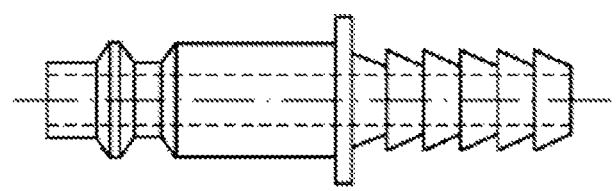
FIG. 3 shows, in contrast, an alternative nipple of European (long neck) standard, which is not employed in this example.
Figure 4:
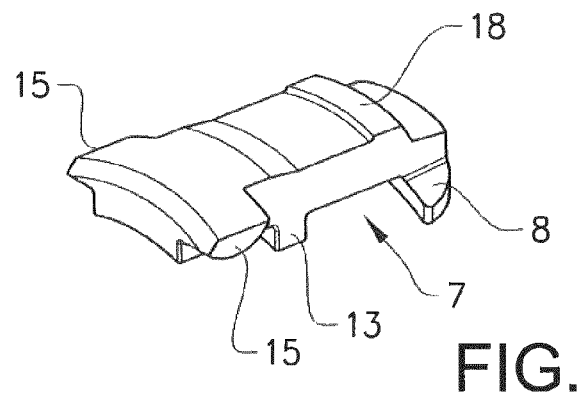
FIG. 4 shows a pawl, two of which are employed in the embodiment of the present invention.

The figures will refer primarily to a single non-limiting example, designed for a safety coupling for use with an Asian standard short-neck compressed air hose nipple, as shown in FIG. 2. Only a single exemplary embodiment of the female coupling-half of the invention is shown in the drawings and there is uniform numbering of each element throughout the drawings.

Figure 1:
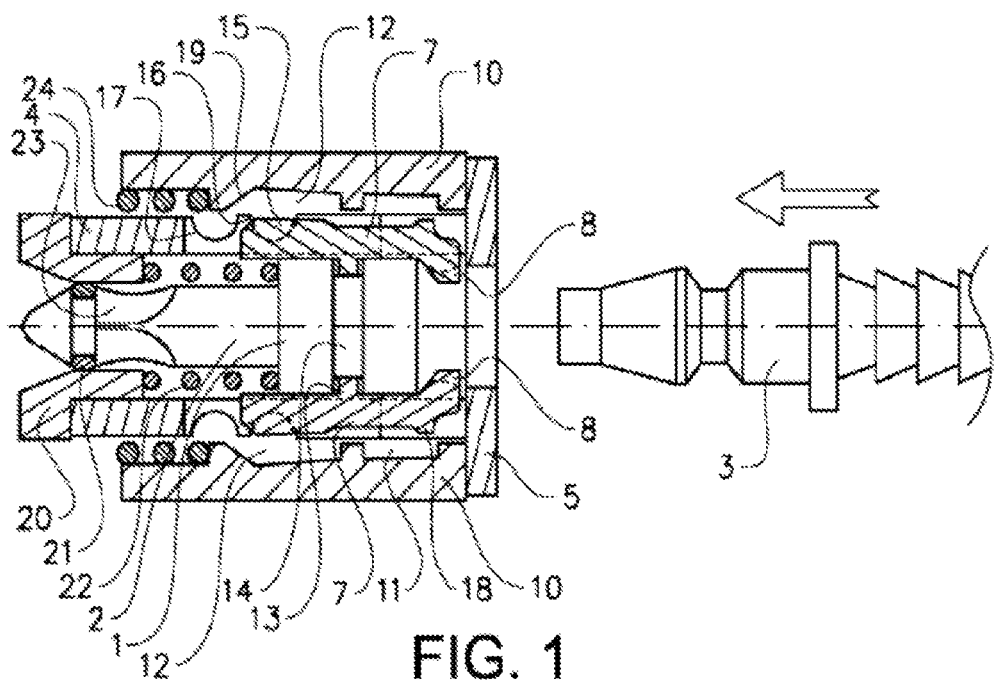
FIG. 1 shows the female coupler-half according to the invention in its decoupled state.
Figure 6:
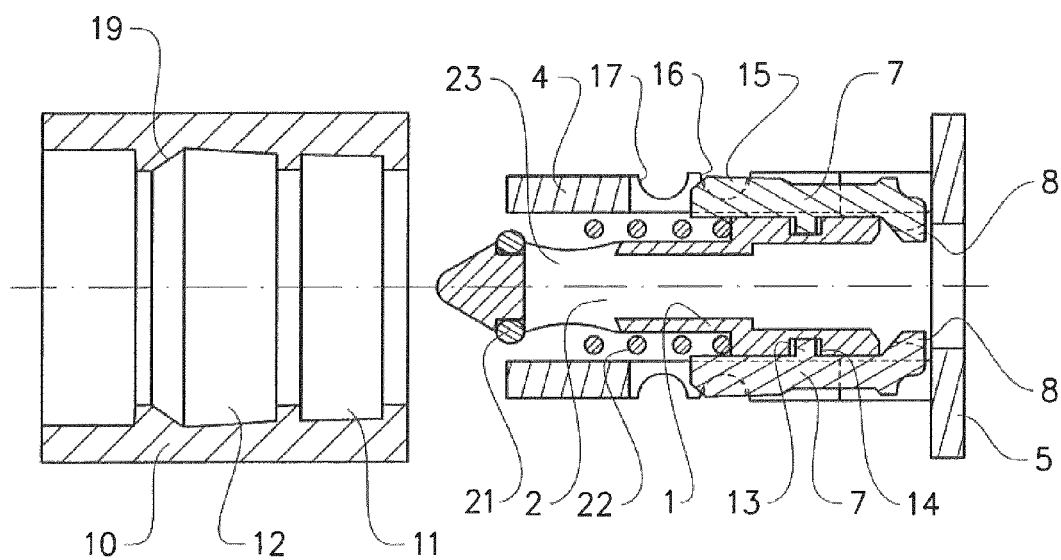
FIG. 6 shows on the left a knurled, manually operated decoupling sleeve which, after assembly, surrounds the female coupler-half assembly to the right in the figure.

FIG. 1 shows a female hose coupling-half suitable for use with a short neck Asian standard nipple. A valve 1 has a hollow body 2 [shown in longitudinal section in FIG. 6] with openings 23 and at its end a rubber O-ring 21. There is a surrounding ring 20 against which the rubber O-ring 21 seals to close the valve. The valve 1 is also provided with a cylindrical socket for receiving the end of a short-neck Asian standard nipple 3. The valve is spring-biased 22 to the right in the drawing to keep the valve 1 of female hose coupling-half, which is connected to the supply of compressed air, closed when no nipple has been completely inserted.

Figure 5:
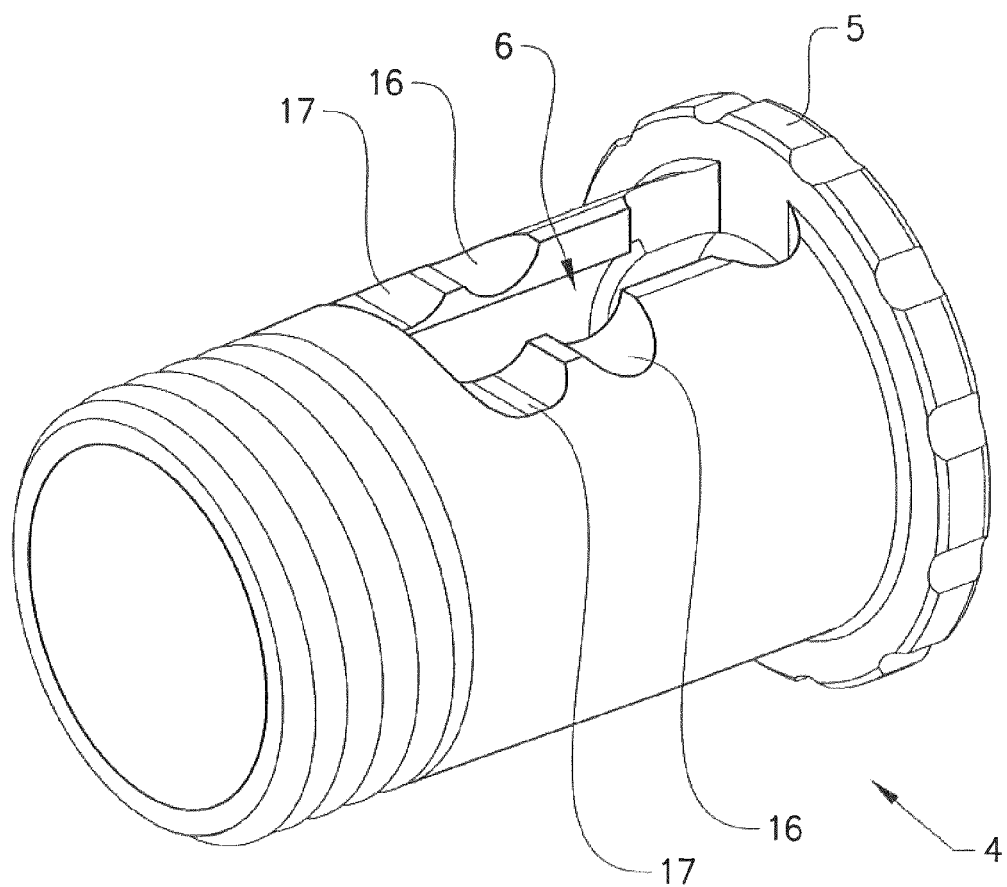
FIG. 5 shows by itself a metal tube, which in the assemble coupling-half, surrounds the valve and is, in turn, surrounded by the decoupling sleeve.

A tube 4 slidably holds the valve 1 and is integral in this example with a protective collar 5, to protect against inadvertent release, as will be explained in more detail below. The tube is in turn surrounded by a manually operated spring 24 biased sleeve 10. Said tube 4 is shown alone in FIG. 5 and is provided in this example with two longitudinal slots 6, disposed in diametric opposition. (See FIG. 12 as well). Each of these slots 6 holds a pawl 7, with a distal (to the right in FIGS. 1, 4-11) detent 8 which engages a circumferential nipple groove to hold the nipple in either a fully coupled compressed air delivery position or an intermediate holding position for pressure relief prior to complete disengagement, as will be described below. Each pawl 7 has a proximal (to the left in FIGS. 1, 4-11) detent 15, which is rounded to be able to slide, when not held down by the interior of the sleeve 10, between a distal and a proximal depression 16 and 17 respectively crossing each slot 6. Each pawl has a central projection 13, which rests in a circumferential groove 14 in the valve body 1 and forms a fulcrum about which the pawl can see-saw to bring the detents 8,15 in and out of engagement, as will be described in more detail below. This see-saw action is crucially important in significantly increasing the wear strength and life of the components over previous designs, particularly in view of the interaction between brass and steel components. Each pawl is also provided with a radially outward heel 18 near its distal end.

The spring-biased 24 sleeve 10 surrounding the tube 4 can be manually actuated for decoupling. The interior of the sleeve is provided with two circumferential cavities 11 and 12 [see FIG. 6], which permit the detents to see-saw in and out of engagement, in various axial positions of the sleeve 10.

Figure 7:
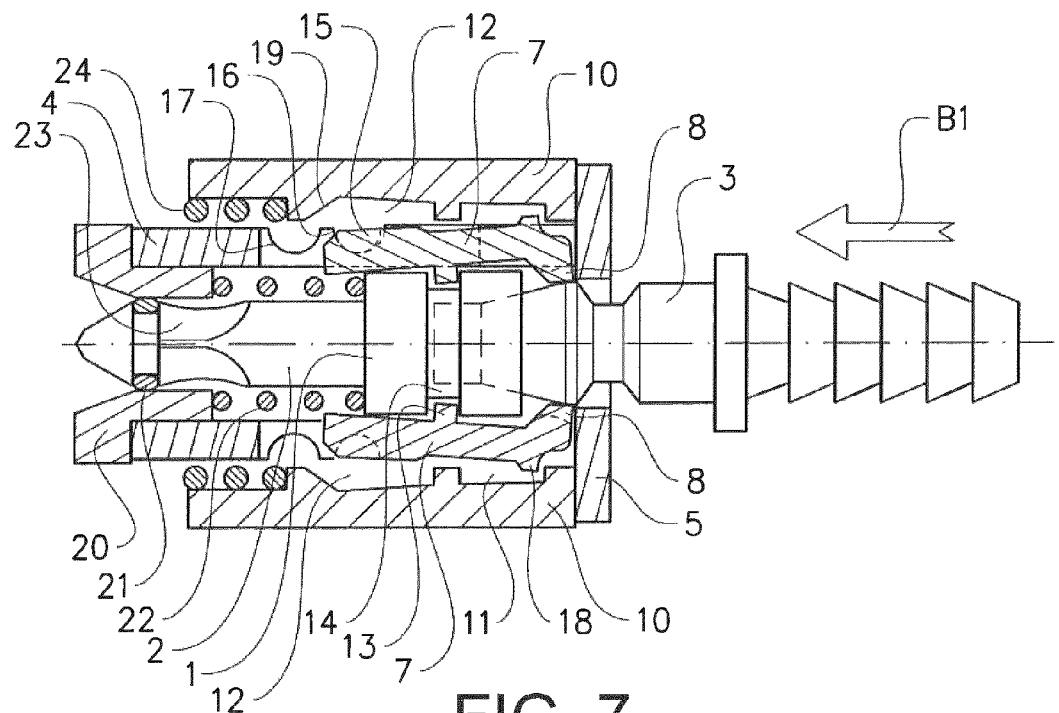
FIGS. 7-9 show successive steps of the coupling insertion of the nipple into the female coupling-half according to the invention.
Figure 8:
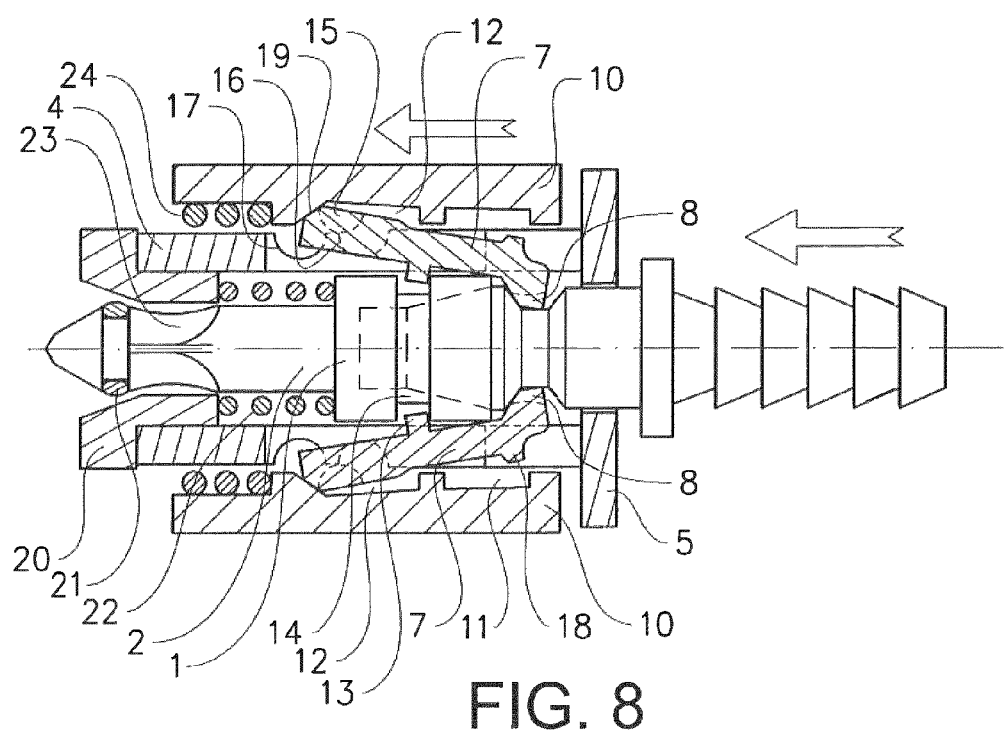
Figure 9:
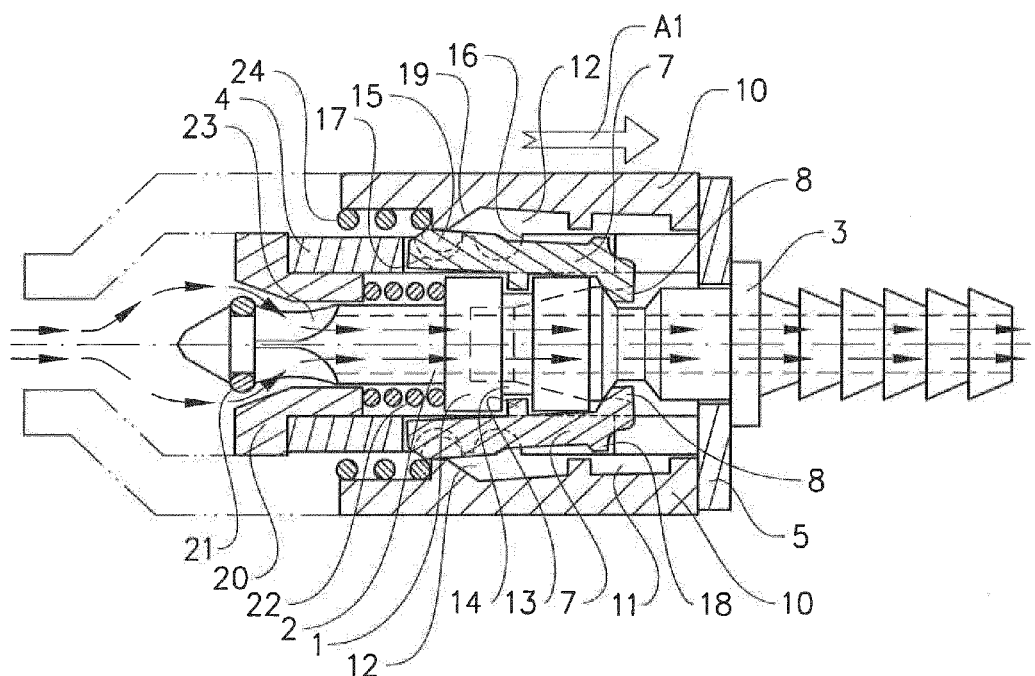

The inventive female coupling-half functions as follows together with the short neck hose nipple of Asian standard. A hose nipple 3 is seen in FIG. 7 being inserted into the female coupling-half of the invention. The sleeve 10 is still in its forward spring-biased position, as is the valve 1, keeping the compressed air supply closed. The incoming (see arrow B1) head of the nipple pushes the distal detent 8 of each pawl 7 radially outwards. This is permissible because the sleeve 10 is in its completely forward position with its distal cavity 11 aligned with each heel 18, which can now enter the distal cavity 11, permitting the nipple to enter the cylindrical socket in the body 2 of the valve 1. As the user continues to push the nipple 3 into the female coupling-half, the valve body 2 is forced to the left in the drawing against the force of the spring 22, thereby opening the supply of compressed air into the nipple and its hose (not shown). [See FIG. 9.] The movement of the valve body 2 also brings with it the two pawls 7 because of the engagement between the groove 14 and the projection 13 on each pawl 7. This movement of each pawl is shown in FIG. 8 with the proximal rounded detent 15 sliding from the distal depression 16 towards the proximal depression 17 in the outer surface of the tube 4. The interior proximal cavity 12 in the sleeve 10 has a circumferential oblique surface 19 at its proximal end. The sleeve 10 will move slightly to the left as shown in the figures but this oblique surface will force the proximal detent 15 into the proximal depression 17 in the tube 4 and the sleeve will return (Arrow A1) to its original extended position as shown in FIG. 9, which shows the coupling in its fully engaged locked position, holding the proximal detent 15 and thus the pawl 7 in its locked position. This locked position utilises both of the detents and the projection 13, all securely held in a firm locking position by the interior surfaces of the sleeve 10.

The person skilled in the art will of course understand that the cavities 11 and 12 can be altered in diameter and shape within the scope of the invention, achieving the same effects.

Figure 10:
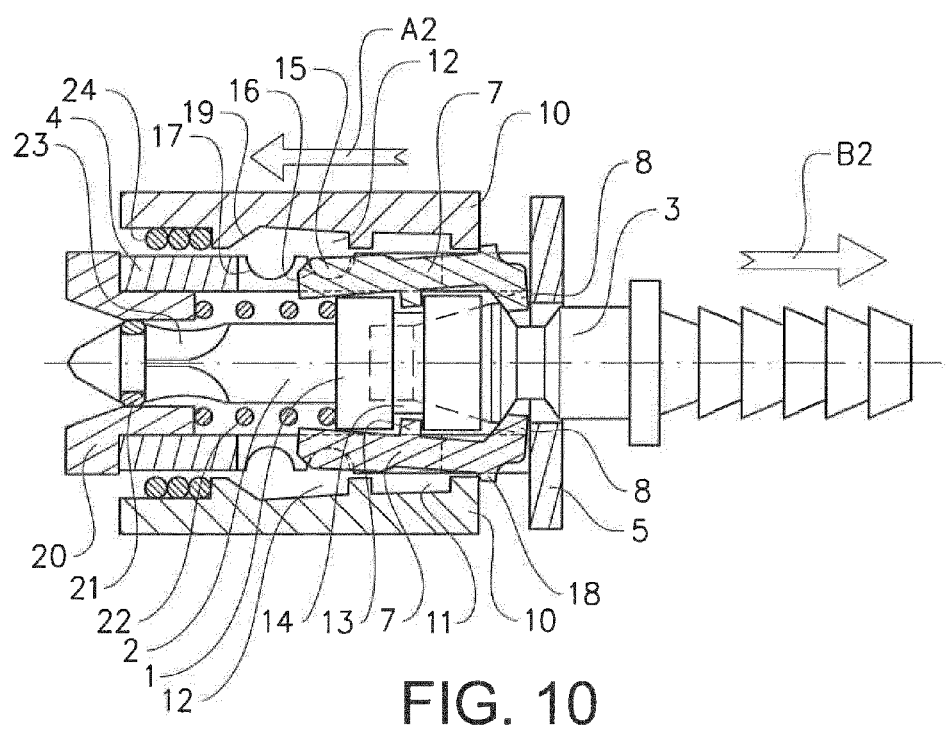
FIG. 10 shows the intermediate pressure relief nipple hold position upon manual retraction of the knurled sleeve for decoupling.
Figure 11:
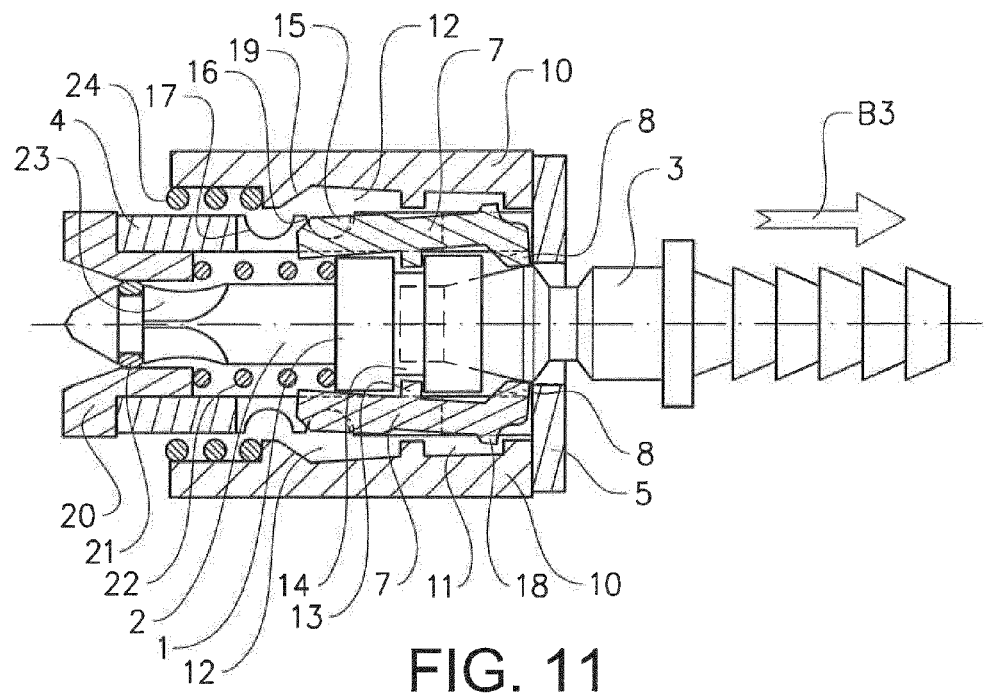
FIG. 11 shows the complete release of the nipple during decoupling.
Figure 11B:
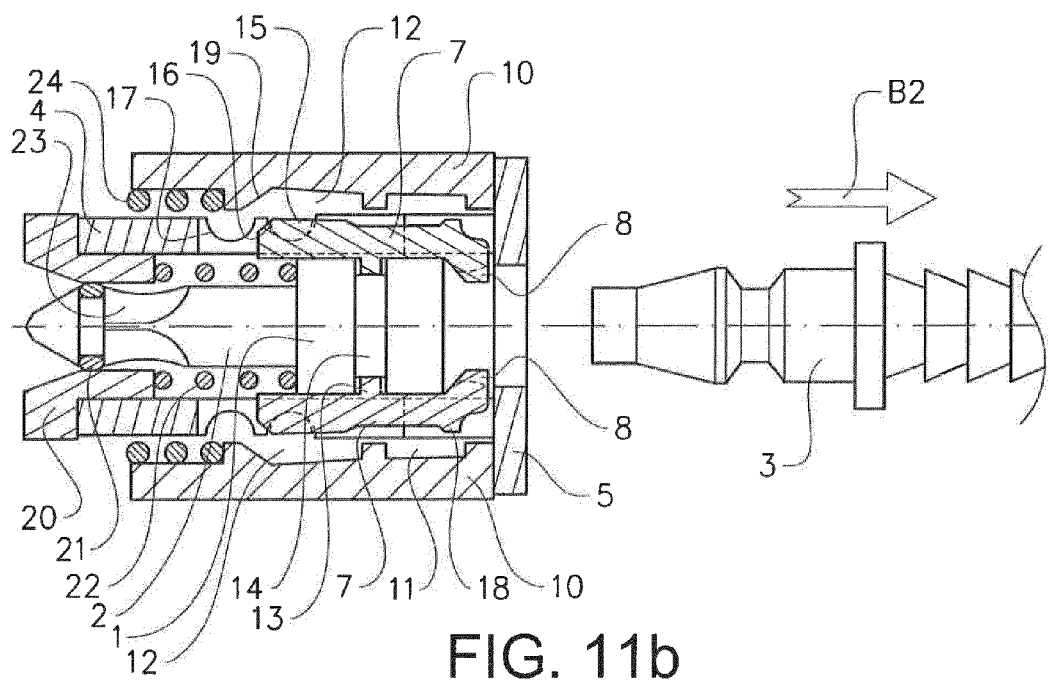
FIG. 11b shows the female coupling-half after removal of the nipple with the sleeve 10 in its original position.

To decouple, the user must pull back on the sleeve 10, whereby the proximal detent 15 of the pawl 7 can slide up and into the distal depression 16 of the tube 4 and the spring 22 of the valve will push the body 2 of the valve forward thus closing the valve as shown now in FIG. 10. In this position [FIG. 10], the nipple has moved in the direction of the arrow B2 but is still held by the sleeve 10, the pawl 7 and the distal detent 8 of the pawl 7, while the residual pressure is released since the nipple has moved slightly out of sealing engagement with the valve socket. This prevents high residual pressure from launching the hose nipple or the female coupling half at high speed, resulting in possible injury to persons or damage. The final extraction of the nipple is only possible when the sleeve 10 has been let go of, after pressure relief, and it returns to its original extended position as shown in FIG. 11, permitting the nipple to exit from the female part. As a further safety feature, the sleeve 10 will not return to its original position as shown in FIG. 11 until there is no longer high pressure trying to expel the nipple, even though the operator has released the sleeve 10 from his grip. The nipple will be held in the intermediate pressure relief position, even if the operator lets go of the sleeve as long as there is high pressure in the system. This function can be understood by viewing FIG. 10, wherein we suppose there is a strong residual pressure pushing the nipple in the direction of the arrow B2. The edge of the circumferential groove will press against the distal detents 8 thus keeping the heels 18 of each pawl 7 in contact with the sleeve 10, keeping the sleeve from advancing to its extended original position [FIG. 11], where the interior circumferential cavity 11 now gives space to the heels 18 so that the distal detents 8 will completely release the nipple.

Figure 12:
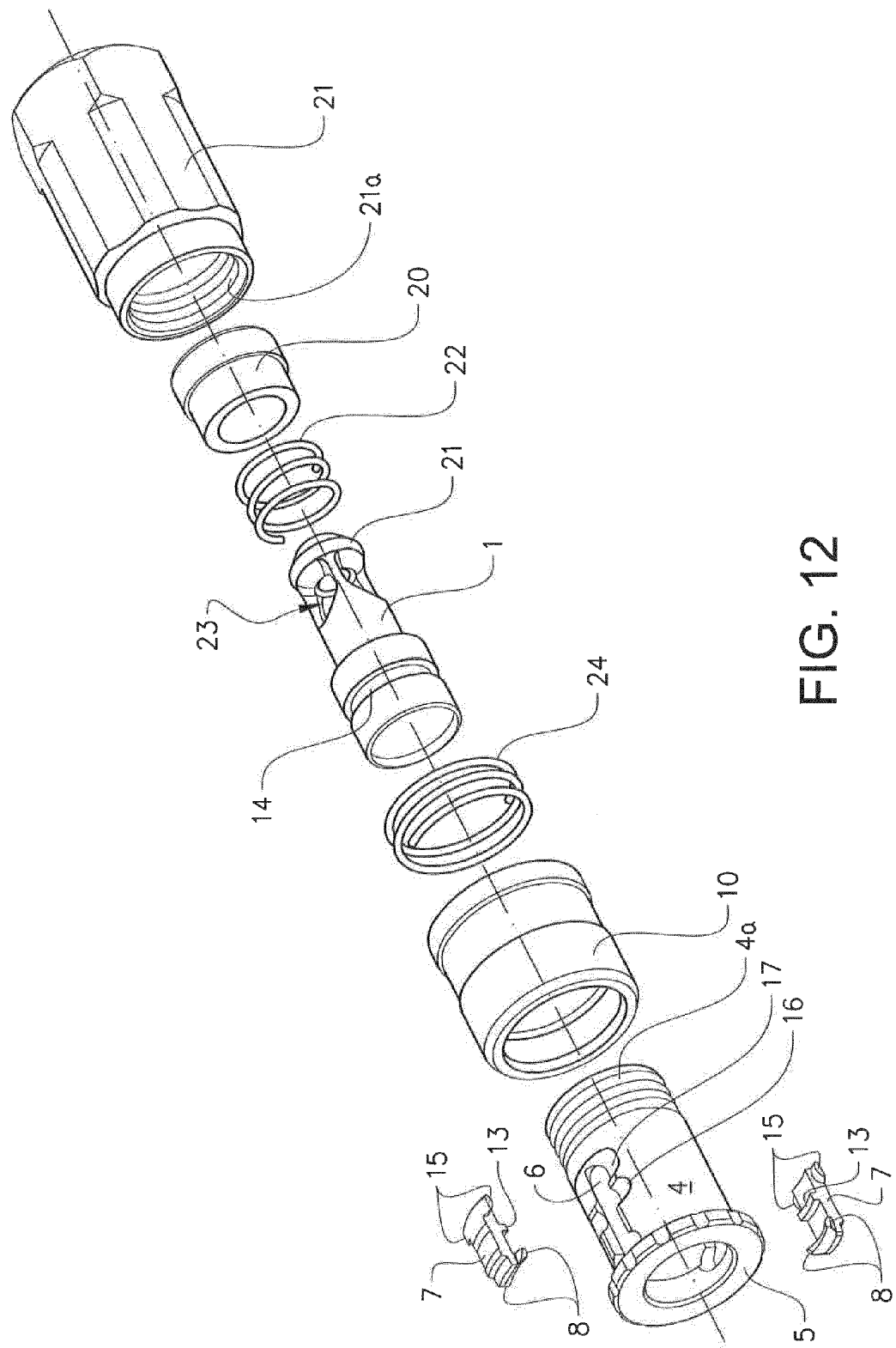
FIG. 12 is an exploded view of a female coupler half according to the present invention.

For better understanding of the components of the exemplary coupler half of the invention, FIG. 12 shows an exploded view. The tube 4 is provided with a threaded portion 4a at its end for screwing into interior threads 21a in pipe fitting 21, to thus hold the entire coupling-half assembly together for use. The spring 22, mounted between the sleeve 10 and the pipe fitting 21, biases the sleeve 10 to its position to the right in FIG. 1 for example.

This novel arrangement with the projections engaging the body of the valve permits the arrangement of a protective collar 5 on the tube. The protective collar prevents inadvertent retraction of the sleeve, and decoupling, should the hose and coupling be pulled and become stuck in some impediment on the floor for example.

Although the present invention has been illustrated here as used with a pneumatic system, the skilled art worker will recognize that it can, with proper adaptation, be applied, within the scope of the appended claims, in different types of fluid medium delivery systems, i.e. gas and liquid delivery systems, such as for breathing air and oxygen, high pressure systems and hydraulic systems.

The invention claimed is:
1. A female coupling-half, suitable for coupling together with a fluid medium nipple having a circumferential nipple groove, the female coupling-half comprising:
    a valve having a body with a cylindrical socket for receiving the fluid medium nipple, for controlling the flow of a fluid medium through the female coupling-half;

a tube which slidably holds the valve and is provided with a plurality of axial through-slots;

a plurality of pawls each pawl of the plurality of pawls having a proximal detent and a distal detent at opposite ends thereof and a projection intermediate the proximal detent and the distal detent, each pawl of the plurality of pawls being held in an individual through-slot of the plurality of axial through-slots;

a manually axially displaceable spring-loaded sleeve surrounding the tube and being provided with at least one interior circumferential cavity permitting disengagement of the distal detents engaged in the circumferential nipple groove in selected axial positions of the axially displaceable spring-loaded sleeve;

wherein the body of the valve comprises a circumferential groove disposed on an exterior of the body in which there rests the projection of each pawl of the plurality of pawls, whereby each pawl of the plurality of pawls is made to move axially together with the body; and wherein the proximal detent of each pawl of the plurality of pawls can be displaced from a distal circumferential external depression in the tube to a proximal external depression for completed coupling of the female coupling-half and the fluid medium nipple wherein the valve is opened.

2. The female coupling-half according to claim 1, wherein the manually axially displaceable spring-loaded sleeve comprises a distal interior circumferential cavity and a proximal interior circumferential cavity, such that when the spring-loaded sleeve is retracted the proximal interior circumferential cavity is disposed above a proximal external depression in the tube to permit the proximal detent to exit a completely coupled, valve-open position resting in the proximal external depression, and move to a distal external depression in the tube, whereby the valve closes and pressure is released between the fluid medium nipple and the valve.

3. The female coupling-half according to claim 2, wherein a proximal end surface of the proximal internal circumferential cavity is oblique.

4. The female coupling-half according to claim 2, wherein upon retraction of the spring-biased sleeve, the fluid medium nipple is kept from immediate complete release by the distal detent being held in the circumferential nipple groove.

5. The female coupling-half according to claim 4, wherein the distal detent is held in the circumferential nipple groove by a heel on each pawl of the plurality of pawls, the heel engaging and holding the spring-loaded sleeve in a retracted position.

6. The female coupling-half according to claim 1, wherein the female coupling-half is suited for use with compressed air.

\* \* \* \* \*

UNITED STATES PATENT AND TRADEMARK OFFICE
CERTIFICATE OF CORRECTION

PATENT NO. : 9,322,500 B2  
APPLICATION NO. : 14/111478  
DATED : April 26, 2016  
INVENTOR(S) : Björn Engdahl Page 1 of 1

It is certified that error appears in the above-identified patent and that said Letters Patent is hereby corrected as shown below:

TITLE PAGE

Assignee item (73)   Replace "(73) Assignee: CEIN AB, Skövde (SE)"  
with -- (73) Assignee: CEJN AB, Skövde (SE) --

Signed and Sealed this  
Twenty-eighth Day of June, 2016

Michelle K. Lee  
*Director of the United States Patent and Trademark Office*